United States Patent [19]
Walker et al.

[11] Patent Number: 5,237,658
[45] Date of Patent: Aug. 17, 1993

[54] LINEAR AND ORTHOGONAL EXPANSION OF ARRAY STORAGE IN MULTIPROCESSOR COMPUTING SYSTEMS

[75] Inventors: Mark Walker, Los Gatos; Albert S. Lui, San Jose, both of Calif.; Harald W. Sammer, Friedrichsdorf, Fed. Rep. of Germany; Wing M. Chan, Pleasanton; William T. Fuller, San Jose, both of Calif.

[73] Assignee: Tandem Computers Incorporated, Cupertino, Calif.

[21] Appl. No.: 769,538
[22] Filed: Oct. 1, 1991
[51] Int. Cl.$^5$ .............................................. G06F 13/00
[52] U.S. Cl. .................................... 395/200; 395/325; 395/425; 395/575; 371/10.2
[58] Field of Search .................. 364/DIG. 1, DIG. 2; 395/200, 275, 325, 425, 800, 575; 371/10.2

[56] References Cited

U.S. PATENT DOCUMENTS

| | | |
|---|---|---|
| 3,893,178 | 7/1975 | Sordello . |
| 4,092,732 | 5/1978 | Ouchi . |
| 4,467,421 | 8/1984 | White . |
| 4,562,576 | 12/1985 | Ratcliffe . |
| 4,667,326 | 5/1987 | Young et al. . |
| 4,722,085 | 1/1988 | Flora et al. . |
| 4,754,397 | 6/1988 | Varaiya et al. . |
| 4,761,785 | 8/1988 | Clark et al. . |
| 4,768,193 | 8/1988 | Takemae . |
| 4,775,978 | 10/1988 | Hartness . |
| 4,811,210 | 3/1989 | McAulay ............................ 395/325 |
| 4,817,035 | 3/1989 | Timsit . |
| 4,849,929 | 3/1989 | Timsit . |
| 4,870,643 | 9/1989 | Bultman et al. . |
| 4,899,342 | 2/1990 | Potter et al. . |
| 4,914,656 | 4/1990 | Dunphy, Jr. et al. . |
| 4,985,830 | 1/1991 | Atac et al. ........................ 395/395 X |
| 4,989,206 | 1/1991 | Dunphy, Jr. et al. . |
| 4,993,030 | 2/1991 | Krakauer et al. . |
| 5,088,081 | 2/1992 | Farr . |
| 5,130,992 | 7/1992 | Frey, Jr. et al. . |
| 5,134,619 | 7/1992 | Hensen et al. . |

OTHER PUBLICATIONS

Patterson, D. A., Gibson, G., and Katz, H.; A Case For Redundant Arrays of Inexpensive Disks (RAID).
Lee, E. K.; Software and Performance Issues in the Implementation of a RAID Prototype (May 1990).
Chen, P., Gibson, G., Katz, R. H., Patterson, D. A., and Schulze, M.; Introduction to Redundant Arrays of Inexpensive Disks (RAID (Dec. 1988).
Chen, P., Gibson, G., Katz, R. H., Patterson, D. A., and Schulze, M., et al. Evolution of the Raid 2 Architecture (Jun. 12, 1990).
Maximum Strategy, Inc., San Jose, Cailf.; Strategy 2 Disk Array Controller Operation Manual (Nov. 2, 1988).
Maximum Strategy, Inc., San Jose, Cailf.; Strategy 1 Disk Array Controller Operation Manual (Date unknow).
Gibson, G. A., Performance and Reliability in Redundant Arrays of Inexpensive Disks (Date Unknown).
Chen, P., An Evaluation of Redundant Arrays of Disk Using an Amdahl 5890; (May 1989).
Katz, R. H., Gibson, G. A., and Patterson, D. A.,; Disk System Architectures for High Performance Computing (Mar. 1989).
Gray, J., Horst, B., and Walker, M.; Parity Striping of Disc Arrays: Low-Cost Reliable Storage with Acceptable Throughput (Jan. 1990).
Schultz, M. E.; Considerations in the Design of a Raid Prototype (Aug. 1988).
Clark, and Corrigan; IBM Systems Journal, vol. 23, No. 3, 1989.

*Primary Examiner*—Robert L. Richardson
*Attorney, Agent, or Firm*—Spensley Horn Jubas & Lubitz

[57] ABSTRACT

A multiprocessing computer system with data storage array systems allowing for linear and orthogonal expansion of data storage capacity and bandwidth by means of a switching network coupled between the data storage array systems and the multiple processors. The switching network provides the ability for any CPU to be directly coupled to any data storage array. By using the switching network to couple multiple CPU's to multiple data storage array systems, the computer system can be configured to optimally match the I/O bandwidth of the data storage array systems to the I/O performance of the CPU's.

34 Claims, 5 Drawing Sheets

FIG. 1

PRIOR ART

LINEAR AND ORTHOGONAL EXPANSION OF ARRAY STORAGE IN MULTIPROCESSOR COMPUTING SYSTEMS

BACKGROUND OF THE INVENTION

1. Field of the Invention

This invention relates to computer systems, and more particularly to a multiprocessing computer system with data storage array systems allowing for linear and orthogonal expansion of data storage capacity and bandwidth by means of a switching network.

2. Description of Related Art

A typical multiprocessing computer system generally involves one or more data storage units which are connected to a plurality of Central Processor Units (CPU's), either directly through an input/output (I/O) bus, or through an I/O control unit and one or more I/O channels. The function of the data storage units is to store data and programs which the CPU's use in performing particular data processing tasks.

Figure 1:
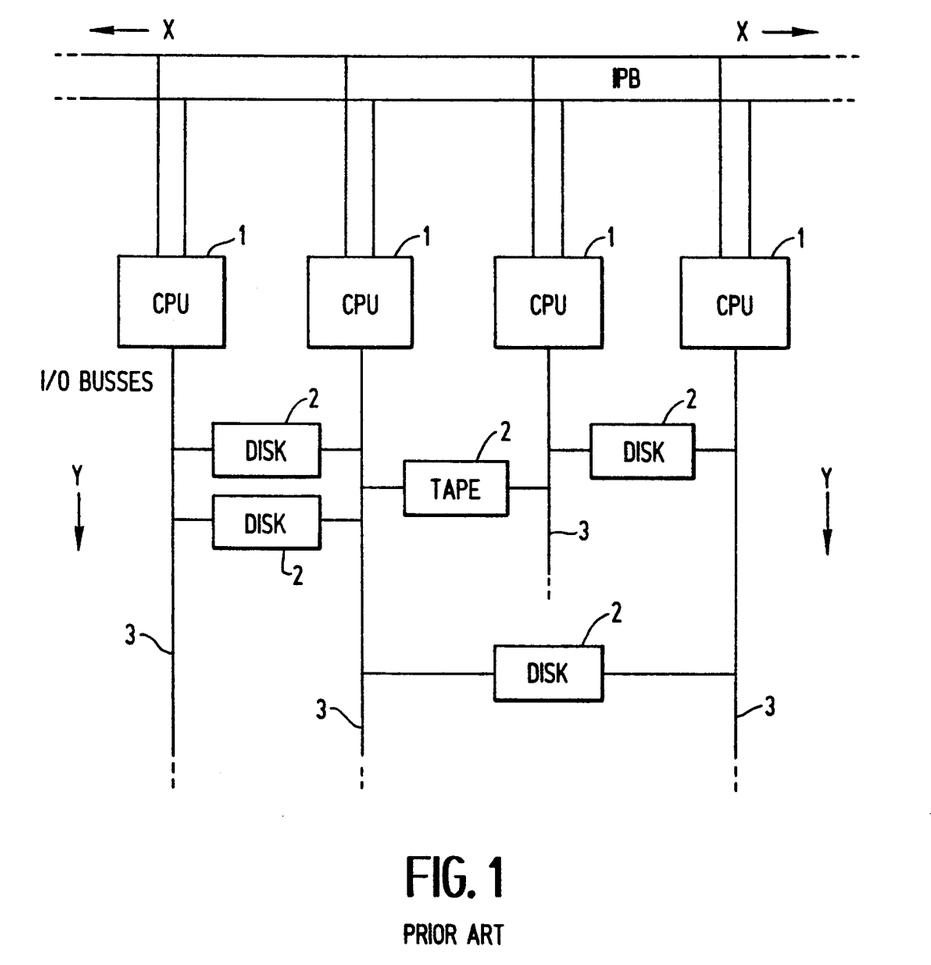
FIG. 1 is a block diagram of a prior art multiprocessor system.

One type of multiprocessing system known in the art is described in U.S. Pat. No. 4,228,496, assigned to the assignee of the present invention. A simplified version of the computer system architecture taught in that patent is shown in FIG. 1. The system shown therein provides for a high degree of reliability by providing two redundant interprocessor busses IPB interconnecting a plurality of CPU's 1. However, where cost predominates over reliability concerns, a single interprocessor bus may be used in a multiprocessing system.

The system shown in FIG. 1 includes a plurality of data storage units 2, each coupled to at least two CPU's 1 by means of an I/O bus 3 (or, alternatively, through redundant I/O control units). Various type of data storage units are used in such a data processing system. A typical system may include one or more large capacity tape units and/or disk drives (magnetic, optical, or semiconductor). Again, if cost is a predominant factor, single connections rather than dual connections can be used.

Any CPU 1 in the architecture can access any directly coupled data storage unit 2. In addition, any CPU 1 in the architecture can access any other data storage unit 2 indirectly over the IPB via another CPU 1.

The architecture shown in FIG. 1 allows for linear expansion of computing resources by adding CPU's 1 to the interprocessor bus IPB, in the "x" direction (see FIG. 1). The architecture also allows for linear expansion of I/O resources by adding data storage units 2 to the I/O busses or channels, in the orthogonal "y" direction. Expansion in the x and y directions can be independent of each other, limited only by performance and physical constraints.

Thus, the current art provides for linear expansion of CPU's and orthogonal and linear expansion of individual data storage units 2 to correspond to the storage requirements of the CPU's.

More recently, highly reliable disk array data storage systems have been introduced to the market. Such disk array systems present a challenge when coupled within such a multiprocessor architecture.

Disk array systems are of various types. A research group at the University of California, Berkeley, in a paper entitled "A Case for Redundant Arrays of Inexpensive Disks (RAID)", Patterson, et al., *Proc. ACM SIGMOD*, June 1988, has catalogued a number of different types by defining five architectures under the acronym "RAID" (for Redundant Arrays of Inexpensive Disks).

A RAID 1 architecture involves providing a duplicate set of "mirror" data storage units and keeping a duplicate copy of all data on each pair of data storage units. A number of implementations of RAID 1 architectures have been made, in particular by Tandem Computers Incorporated.

A RAID 2 architecture stores each bit of each word of data, plus Error Detection and Correction (EDC) bits for each word, on separate disk drives. For example, U.S. Pat. No. 4,722,085 to Flora et al. discloses a disk drive memory using a plurality of relatively small, independently operating disk subsystems to function as a large, high capacity disk drive having an unusually high fault tolerance and a very high data transfer bandwidth. A data organizer adds 7 EDC bits (determined using the well-known Hamming code) to each 32-bit data word to provide error detection and error correction capability. The resultant 39-bit word is written, one bit per disk drive, on to 39 disk drives. If one of the 39 disk drives fails, the remaining 38 bits of each stored 39-bit word can be used to reconstruct each 32-bit data word on a word-by-word basis as each data word is read from the disk drives, thereby obtaining fault tolerance.

A RAID 3 architecture is based on the concept that each disk drive storage unit has internal means for detecting a fault or data error. Therefore, it is not necessary to store extra information to detect the location of an error; a simpler form of parity-based error correction can thus be used. In this approach, the contents of all storage units subject to failure are "Exclusive OR'd" (XOR'd) to generate parity information. The resulting parity information is stored in a single redundant storage unit. If a storage unit fails, the data on that unit can be reconstructed on to a replacement storage unit by XOR'ing the data from the remaining storage units with the parity information. Such an arrangement has the advantage over the mirrored disk RAID 1 architecture in that only one additional storage unit is required for "N" storage units. A further aspect of the RAID 3 architecture is that the disk drives are operated in a coupled manner, similar to a RAID 2 system, and a single disk drive is designated as the parity unit. One implementation of a RAID 3 architecture is the Micropolis Corporation Parallel Drive Array, Model 1804 SCSI, which uses four parallel, synchronized disk drives and one redundant parity drive. The failure of one of the four data disk drives can be remedied by the use of the parity bits stored on the parity disk drive. Another example of a RAID 3 system is described in U.S. Pat. No. 4,092,732 to Ouchi.

A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk(this is also known as block striping). A further aspect of the RAID 4 architecture is that a single storage unit is designated as the parity unit.

A RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes". Each stripe has N blocks of data, plus one parity block on one storage unit containing parity for the remainder of the stripe. Further stripes each have a parity block, the parity blocks being distributed on different storage units. Parity updating activity associated with every modification of data in a redundancy group is therefore distributed over the different storage units. No single unit is burdened with all of the parity update activity. For example, in a RAID 5 system comprising 5 disk drives, the parity information for the first stripe of blocks may be written to the fifth drive; the parity information for the second stripe of blocks may be written to the further drive; the parity information for the third stripe of blocks may be written to the third drive; etc. The parity block for succeeding stripes typically "precesses" around the disk drives in a helical pattern (although other patterns may be used). Thus, no single disk drive is used for storing the parity information, as in the RAID 4 architecture. An example of a RAID 5 system is described in U.S. Pat. No. 4,761,785 to Clark et al.

The challenge posed in coupling disk array data storage systems to a multiprocessor architecture that provides for linear and orthogonal CPU and data storage expansion is in matching the I/O bandwidth of the disk array systems to the I/O capacity of the coupled CPU's. Because of the overhead cost of the array controller needed to manage a disk array, many data storage units are required within the array to achieve cost benefits by spreading the controller cost over multiple data storage units. Additionally, overall disk array system performance increases linearly with the number of data storage units within the system. Therefore, a typical disk array system includes an array controller and 3 or more disks (in some configurations, dozens of disks may be attached). However, the large number of disk in a typical disk array system often results in the array system having greater I/O performance (i.e., data transfers per second) than a single CPU can accommodate, leading to under-utilization of the data transfer capacity of the data storage units. As a consequence, the CPU's directly attached to a disk array system becomes a bottleneck for indirect accesses to the array from other CPU's. Adding additional disk array systems to other CPU's does not resolve the bottleneck problem with respect to data stored in a disk array system that is not directly coupled to such CPU's. Such an approach is also costly because the extra data transfer capacity of each disk array is not used.

It is thus difficult to match the I/O bandwidth of a disk array system to the I/O performance of multiple CPU's in a traditional multiprocessor computer system having linear and orthogonal expandability. It would be desirable to overcome such limitations while retaining the linear and orthogonal expansion characteristics of the known art.

The present invention provides a system which meets these criteria.

SUMMARY OF THE INVENTION

The invention comprises a multiprocessing computer system with disk array data storage systems allowing for linear and orthogonal expansion of data storage capacity and bandwidth by means of a switching network coupled between the disk array systems and the multiple processors.

More specifically, the switching network is coupled between a plurality of CPU's and a plurality of disk array systems. The switching network provides the ability for any CPU to be directly coupled to any disk array.

By using the switching network to couple multiple CPU's to multiple disk array systems, the computer system can be configured to optimally match the I/O bandwidth of the disk array systems to the I/O performance of the CPU's.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the drawings refer to like elements.

DETAILED DESCRIPTION OF THE INVENTION

Throughout this description, the preferred embodiment and examples shown should be considered as exemplars, rather than as limitations on the present invention.

Figure 2:
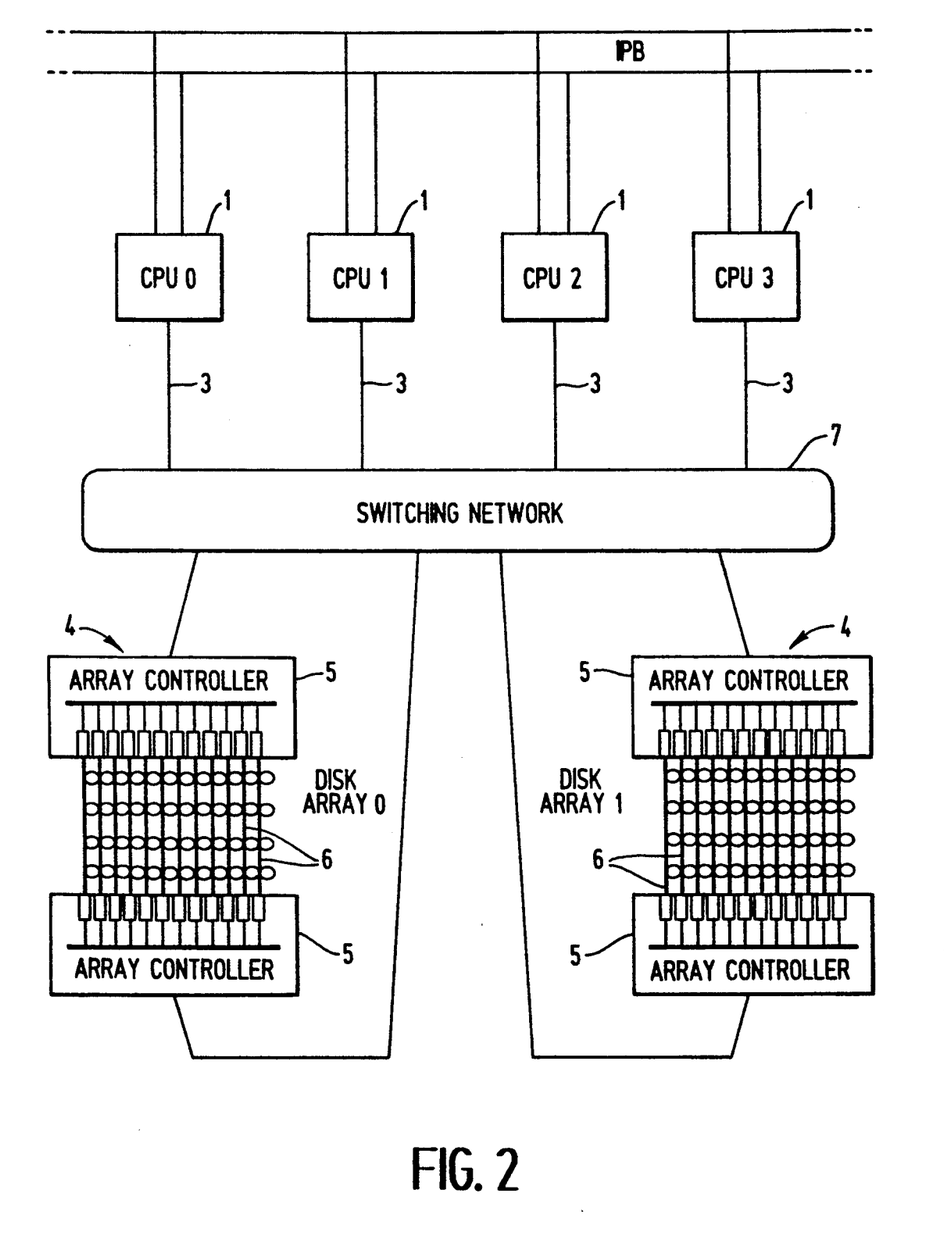
FIG. 2 is a block diagram of a first embodiment of the present invention.

The problems presented by the prior art in coupling a multiprocessing computer system with a disk array system are solved by the present invention by means of a novel architecture of the type shown in FIG. 2. As in the prior art, a plurality of CPU's 1 are coupled together by at least one interprocessor bus IPB. Each CPU 1 has at least one I/O bus 3. In addition, at least one disk array 4, comprising at least one array controller 5 and a plurality of disks 6, is provided to be coupled to the CPU's 1.

In the preferred embodiment, each disk array 4 has at least two array controllers 5 to provide redundancy. The disk arrays may be of any type (e.g., RAID 1 through 5). An example of one such array is shown in U.S. Pat. No. 5,148,432, issued Sep. 15, 1992, entitled "Arrayed Disk Drive System and Method", and assigned to Array Technology Corporation, Colorado, a subsidiary of the assignee of the present invention.

The problems of the prior art are specifically overcome by providing a switching network 7 that is coupled to a plurality of the CPU's 1 by corresponding CPU I/O busses 3, and to each disk array 4. The switching network 7 provides the ability for any CPU 1 to be directly coupled to any disk array 4.

Figure 3A:
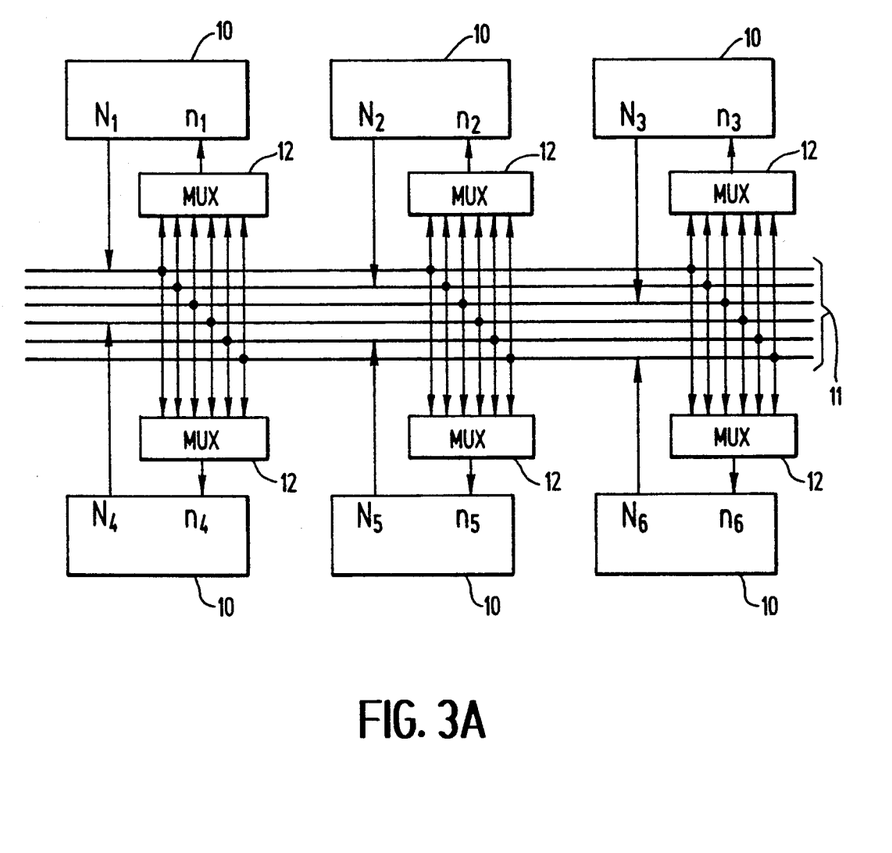
FIG. 3A is a block diagram of a cross-bar switching network suitable for use in conjunction with the present invention.

The switching network 7 may be of any suitable N×N type, capable of directly coupling any node to any other node (i.e., any CPU 1 to any disk array 4). The architecture of the switching network 7 can be, for example, an N×N cross-point switch or an N×N multi-stage switch. An example of a cross-point switch architecture is shown in FIG. 3A, which shows a plurality of nodes 10 and a corresponding plurality of communications links 11. Each node i 10 is coupled via an output port $N_i$ to one communications link 11, and to each of the communications links 11 via an input port $n_i$ through a multiplexor 12. As is known, such couplings permit each node to transfer signals through its output port $N_i$ to any input port $n_i$. The selection of signal paths can be controlled by addresses from each node, in known fashion. Multiple simultaneous couplings are possible if no conflicts in addresses occurs. For example, node #1 can be coupled to node #2 while node #4 is simultaneously coupled to node #6.

Figure 3B:
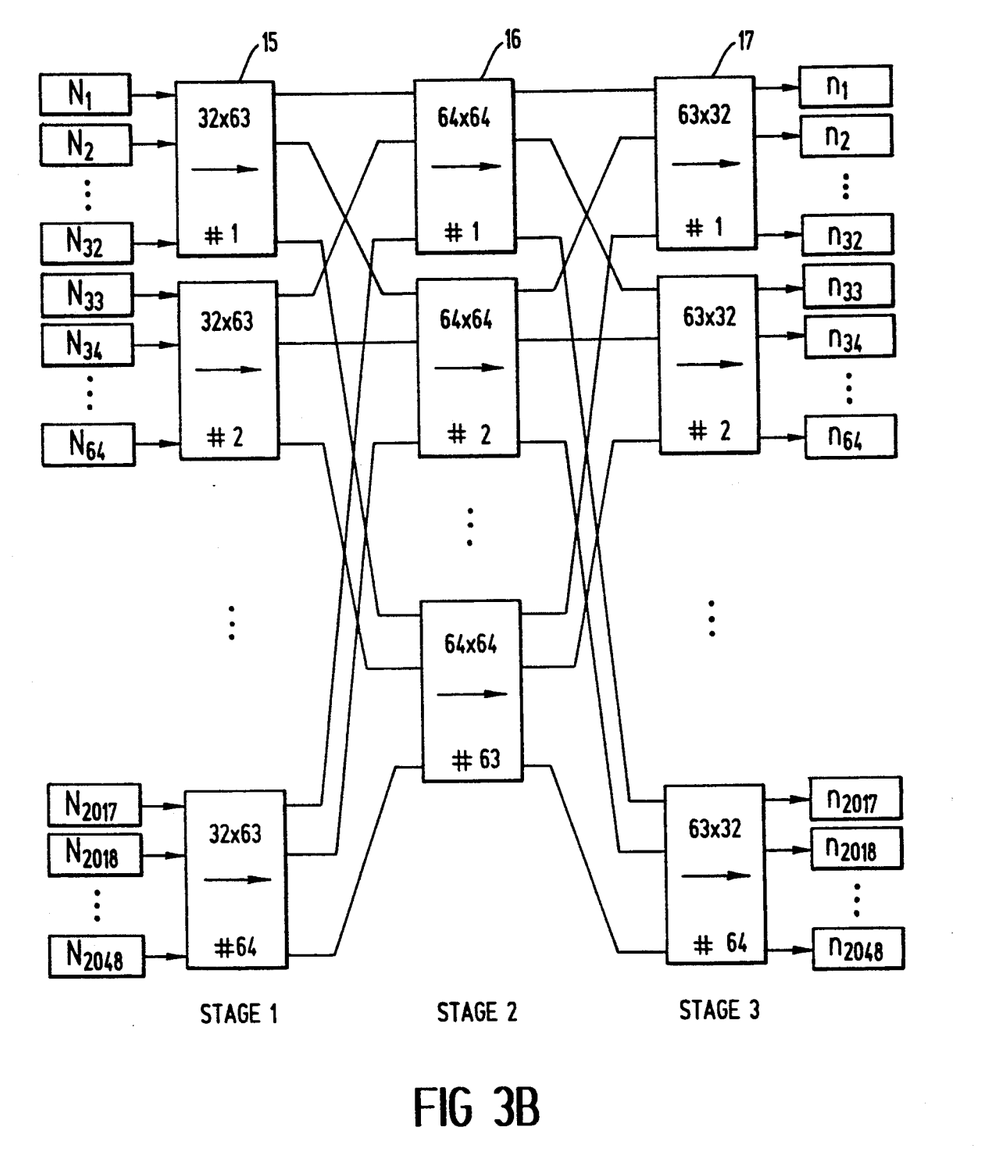
FIG. 3B is a block diagram of multi-stage switching network suitable for use in conjunction with the present invention.

An example of a multi-stage switch architecture is shown in FIG. 3B, which shows a plurality (2,048, by way of example only) of node output ports $N_i$ coupled to an equal number of node input ports $n_i$. In the example shown, 64 Stage 1 selectors 15, each 32×63 in size, permit any one of 32 inputs $N_i$ to be coupled to any one of 63 outputs. The outputs of each Stage 1 selector 15 are coupled to each of 63 selectors 16 comprising Stage 2. The Stage 2 selectors 16 are each 64×64 in size, which permits any one of the 64 inputs to be coupled to any one of 64 outputs. In turn, the outputs of each Stage 2 selector 16 are coupled to each of 64 selectors 17 comprising Stage 3. The Stage 3 selectors 17, each 63×32 in size, permit any one of the 63 inputs to be coupled to any one of 32 outputs $n_i$.

Again, as is known, such couplings permit each node to transfer signals through its output port $N_i$ to any input port $n_i$ (other than its own, in the example shown). For example, if it is desired to couple output port $N_1$ to input port $n_{2048}$, output port $N_1$ is selected as the output of selector #1 in Stage 1. That output is coupled to an input of selector #63 in Stage 2, which selects that input as its output. The output of Stage 2 is coupled to the input of selector #64 in Stage 3, which selects that input as its output. The output of Stage 3 is coupled to input port $n_{2048}$, as desired. Again, the selection of signal paths can be controlled by addresses from each node, and multiple simultaneous couplings are possible if no conflicts in addresses occurs.

Figure 4:
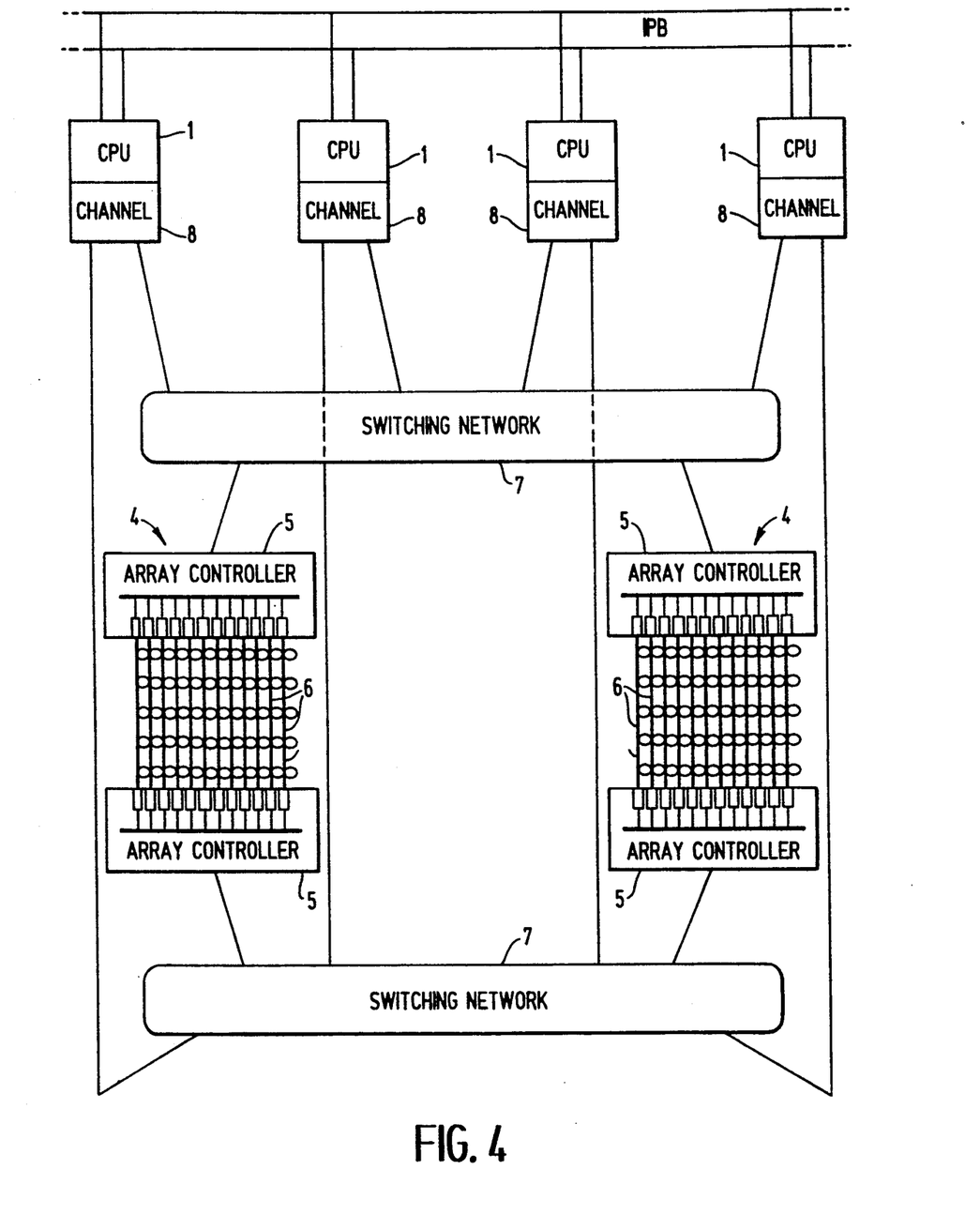
FIG. 4 is a block diagram of a second embodiment of the present invention.

In the preferred embodiment, the switching network 7 comprises fiber optics links for high-speed data transfers. However, wired links may be used for lower speed implementations. Also in the preferred embodiment, the switching network 7 is fault tolerant to provide continuous operation in the event of a failure of any single component. Fault tolerance of this type is well-known in the art. Alternatively, dual switching networks 7 may be provided, coupled as shown in FIG. 4 to multiple CPU's 1 through conventional channel adapters 8, to provide redundancy.

In any case, it is preferable for the switching network 7 to have a data transmission bandwidth approximately equal to the number of nodes (i.e., coupled CPU's) multiplied by the individual I/O channel bandwidth of the CPU's 1. For example, referring to FIG. 2, if CPU #1 is communicating with Disk Array #0, CPU #2 can communicate with Disk Array #1 at the full speed allowed by the I/O link between the two nodes, independent of the operation of CPU #1 and Disk Array #0. This characteristic provides for linear expansion of the CPU's 1 and of the disk arrays 4.

By using a switching network 7 to couple multiple CPU's to multiple disk arrays 4, the computer system can be configured to optimally match the I/O bandwidth of the disk array systems 4 to the I/O performance of the CPU's 1. For example, if an application requires a higher rate of data to be transferred to the CPU's 1, then the system can be expanded linearly in the "y" direction by adding more data storage units 6 to a disk array 4 (up to the data transfer capacity of the I/O channel 3 coupled to that disk array, or up to the data transfer capacity of the array controller 5; thereafter, additional data storage units 6 must be added to another disk array 4, or another disk array 4 must be coupled to the switching network 7). The additional data storage units 6 increase the sum of the data transfer rates of the disk arrays 4.

On the other hand, if the data transfer capacity of the disk arrays 4 exceeds the data transfer capacity of the CPU's 1, or where an application requires a higher rate of I/O to be generated than the CPU's 1 can provide, then the system can be expanded linearly in the "x" direction by coupling more CPU's 1 to the switching network 7. The additional CPU's 1 increase the sum of the data transfer rates of the CPU's as a group.

Thus, the present invention provides a means for matching the I/O bandwidth of a disk array data storage system to the I/O performance of multiple CPU's in a multiprocessor computer system having linear and orthogonal expandability.

A number of embodiments of the present invention have been described. Nevertheless, it will be understood that various modifications may be made without departing from the spirit and scope of the invention. For example, the disk array storage units need not be of the rotating disk (magnetic or optical type, but can be any type of peripheral data storage units, such as magnetic type or semiconductor memory units. Accordingly, it is to be understood that the invention is not to be limited by the specific illustrated embodiment, but only by the scope of the appended claims.

We claim:

1. A multiprocessing computer system comprising:
   a. a plurality of processing units;
   b. at least one data storage array system, each having at least one array controller;
   c. switching network means, coupled to the plurality of processing units and to at least one array controller of at least one data storage array system, for establishing a communications link between at least one selected processing unit and at least one data storage array system.

2. The multiprocessing computer system of claim 1, wherein the switching network means comprises a cross-point switch.

3. The multiprocessing computer system of claim 1, wherein the switching network means comprises a multi-stage switch.

4. A linearly and orthogonally expandable multiprocessing computer system comprising:
   a. at least two processing units, each processing unit having a respective input/output data transfer rate;
   b. at least one interprocessor bus for intercoupling the at least two processing units, the at least one bus having sufficient capacity to be coupled to at least one additional processing unit;

c. at least one data storage array system including at least two data storage units, at least one data storage array system having sufficient capacity to be coupled to at least one additional processing unit, each data storage array system having a respective input/output data transfer rate;

d. switching network means, coupled to the processing units and to at least one data storage array system, for establishing a communications link between at least one selected processing unit and at least one data storage array system, the switching network means having an input/output data transfer rate;

wherein the input/output data transfer rate of the switching network means at least equals the sum of input/output data transfer rates of either the processing units or the data storage array systems, and additional data storage units may be added to at least one data storage array system to increase the sum of the input/output data transfer rates of the data storage array systems, and additional processing units may be added to the interprocessor bus to increase the sum of the input/output data transfer rates of the processing units.

5. The multiprocessing computer system of claim 4, further comprising additional data storage units or additional processing units so that the sum of the input/output data transfer rates of the processing units is matched to approximately equal the sum of the input/output data transfer rates of the data storage array systems.

6. The multiprocessing computer system of claim 4, wherein the switching network means comprises a cross-point switch.

7. The multiprocessing computer system of claim 4, wherein the switching network means comprises a multi-stage switch.

8. The multiprocessing computer system of claim 1, wherein the switching network means is coupled to each array controller.

9. The multiprocessing computer system of claim 8, wherein the switching network means comprises a cross-point switch.

10. The multiprocessing computer system of claim 8, wherein the switching network means comprises a multi-stage switch.

11. A multiprocessing computer system comprising:
a. a plurality of processing units;
b. at least one data storage array system, each having at least one array controller;
c. at least two switching network means, each coupled to the plurality of processing units and to at least one array controller of at least one data storage array system, for establishing a redundant communications link between at least one selected processing unit and at least one data storage array system.

12. The multiprocessing computer system of claim 11, wherein the switching network means comprises a cross-point switch.

13. The multiprocessing computer system of claim 11, wherein the switching network means comprises a multi-stage switch.

14. A multiprocessing computer system comprising:
a. a plurality of processing units;
b. at least one data storage array system, each having at least one array controller;
c. at least one switching network, coupled to the plurality of processing units and to at least one array controller of at least one data storage array system, for establishing a communications link between at least one selected processing unit and at least one data storage array system.

15. The multiprocessing computer system of claim 14, wherein at least one switching network comprises a cross-point switch.

16. The multiprocessing computer system of claim 14, wherein at least one switching network comprises a multi-stage switch.

17. The multiprocessing computer system of claim 14, wherein at least one switching network is coupled to each array controller of at least one data storage array system.

18. The multiprocessing computer system of claim 17, wherein at least one switching network comprises a cross-point switch.

19. The multiprocessing computer system of claim 17, wherein at least one switching network comprises a multi-stage switch.

20. A linearly and orthogonally expandable multiprocessing computer system comprising:
a. at least two processing units, each processing unit having a respective input/output data transfer rate;
b. at least one interprocessor bus for intercoupling the at least two processing units, the at least one bus having sufficient capacity to be coupled to at least one additional processing unit;
c. at least one data storage array system including at least two data storage units, at least one data storage array system having sufficient capacity to be coupled to at least one additional processing unit, each data storage array system having a respective input/output data transfer rate;
d. at least one switching network, coupled to the processing units and to at least one data storage array system, for establishing a communications link between at least one selected processing unit and at least one data storage array system, each switching network having an input/output data transfer rate;

wherein the input/output data transfer rate of at least one switching network at least equals the sum of input/output data transfer rates of either the processing units or the data storage array systems, and additional data storage units may be added to at least one data storage array system to increase the sum of the input/output data transfer rates of the data storage array systems, and additional processing units may be added to the interprocessor bus to increase the sum of the input/output data transfer rates of the processing units.

21. The multiprocessing computer system of claim 20, further comprising additional data storage units or additional processing units so that the sum of the input/output data transfer rates of the processing units is matched to approximately equal the sum of the input/output data transfer rates of the data storage array systems.

22. The multiprocessing computer system of claim 20, wherein at least one switching network comprises a cross-point switch.

23. The multiprocessing computer system of claim 20, wherein at least one switching network comprises a multi-stage switch.

24. A multiprocessing computer system comprising:
a. a plurality of processing units;

b. at least one data storage array system, each having at least one array controller;

c. at least two switching networks, each coupled to the plurality of processing units and to at least one array controller of at least one data storage array system, for establishing a redundant communications link between at least one selected processing unit and at least one data storage array system.

25. The multiprocessing computer system of claim 24, wherein at least one switching network comprises a cross-point switch.

26. The multiprocessing computer system of claim 24, wherein at least one switching network comprises a multi-stage switch.

27. A data storage system for connection to a multiprocessing computer system including a plurality of processing units, the data storage system comprising:

a. at least one data storage array system, each having at least one array controller;

b. at least one switching network, adapted to be coupled to the plurality of processing units and to at least one array controller of at least one data storage array system, for establishing a communications link between at least one selected processing unit and at least one data storage array system.

28. The data storage system of claim 27, wherein at least one switching network is coupled to each array controller.

29. The data storage system of claim 27, wherein at least one switching network comprises a cross-point switch.

30. The data storage system of claim 27, wherein at least one switching network comprises a multi-stage switch.

31. A linearly and orthogonally expandable data storage system for connection to a multiprocessing computer system comprising at least two processing units, each processing unit having a respective input/output data transfer rate, and at least one interprocessor bus for intercoupling the at least two processing units, the at least one bus having sufficient capacity to be coupled to at least one additional processing unit, the data storage system comprising:

a. at least one data storage array system including at least two data storage units, at least one data storage array system having sufficient capacity to be coupled to at least one additional processing unit, each data storage array system having a respective input/output data transfer rate;

b. at least one switching network, adapted to be coupled to the processing units and to at least one data storage array system, for establishing a communications link between at least one selected processing unit and at least one data storage array system, the switching network having an input/output data transfer rate;

wherein the input/output data transfer rate of at least one switching network at least equals the sum of input/output data transfer rates of either the processing units or the data storage array systems, and additional data storage units may be added to at least one data storage array system to increase the sum of the input/output data transfer rates of the data storage array systems, and additional processing units may be added to the interprocessor bus to increase the sum of the input/output data transfer rates of the processing units.

32. The data storage system of claim 31, further comprising additional data storage units of additional processing units so that the sum of the input/output data transfer rates of the processing units is matched to approximately equal the sum of the input/output data transfer rates of the data storage array systems.

33. The data storage system of claim 31, wherein at least one switching network comprises a cross-point switch.

34. The data storage system of claim 31, wherein at least one switching network comprises a multi-stage switch.

* * * * *